(12) United States Patent
Sorice et al.

(10) Patent No.: US 7,313,228 B1
(45) Date of Patent: Dec. 25, 2007

(54) DYNAMIC CALL PROCESSING CONTROL

(75) Inventors: Stephen Sorice, Raleigh, NC (US);
Rajeshwari Zala, Morrisville, NC (US); Ketan Shah, Cary, NC (US);
Patrick S. Wood, Raleigh, NC (US);
David Erwin, Fuquay-Varina, NC (US);
Matthew Keller, Chapel Hill, NC (US);
Paresh Mehta, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 126 days.

(21) Appl. No.: 10/895,557

(22) Filed: Jul. 21, 2004

(51) Int. Cl.
*H04M 1/64* (2006.01)
(52) U.S. Cl. ............... 379/88.17; 379/93.23; 379/215.01; 370/352; 702/150; 709/229
(58) Field of Classification Search ........... 379/201, 379/76, 265, 268, 67.1, 88.17, 211.01, 265.09, 379/93.23, 215.01; 370/235, 352; 702/150; 709/229
See application file for complete search history.

(56) References Cited

U.S. PATENT DOCUMENTS

| | | | |
|---|---|---|---|
| 5,946,386 A * | 8/1999 | Rogers et al. ......... 379/265.09 |
| 6,404,860 B1 * | 6/2002 | Casellini ................ 379/88.17 |
| 6,766,006 B1 * | 7/2004 | Hu et al. ................... 379/76 |
| 6,791,970 B1 * | 9/2004 | Ng et al. .................. 370/352 |
| 6,845,338 B1 * | 1/2005 | Willins et al. ............ 702/150 |
| 6,879,676 B1 * | 4/2005 | Contractor ............ 379/211.01 |
| 6,907,004 B1 * | 6/2005 | Ramsey et al. ........... 370/235 |
| 2004/0098491 A1 * | 5/2004 | Costa-Requena et al. ... 709/229 |

* cited by examiner

*Primary Examiner*—Gerald Gauthier
(74) *Attorney, Agent, or Firm*—Withrow & Terranova, PLLC

(57) ABSTRACT

The present invention allows a subscriber to dynamically select one or more call processing options while an attempt to terminate an incoming call to an associated terminal is being made. As such, the terminal is either ringing or providing some other indication that an incoming call is being received. Throughout the process, the incoming call may be answered via the terminal. While the attempt to terminate the call is being made, an incoming call message is sent to a computing device associated with the subscriber. The computing device, upon receiving the incoming call message, will provide one or more call processing options to the subscriber. If the subscriber selects one of the call processing options, the computing device will send a subscriber response message identifying the selected call processing option. Based on the selected call processing option, the incoming call will be processed accordingly.

36 Claims, 7 Drawing Sheets

US 7,313,228 B1

DYNAMIC CALL PROCESSING CONTROL

FIELD OF THE INVENTION

The present invention relates to telecommunications, and in particular to controlling how an incoming call is processed while the customer premise equipment is ringing, and without terminating the call to effect such processing.

BACKGROUND OF THE INVENTION

The evolution of telecommunications has resulted in numerous options for handling incoming calls. These options include forwarding the call to another number, rejecting the call, placing the call on hold, and the like. Further, the advent of caller identification affords subscribers the ability to screen calls. Currently, techniques allowing subscribers to control incoming calls require that predefined rules be applied prior to causing the subscriber's customer premise equipment to ring. Thus, there is no opportunity for dynamic real time control of incoming calls by the subscriber. In many instances, the subscriber may desire a different call processing option depending on a given situation or the timing involved with the call. In essence, predefined rules that are set up prior to attempting to terminate the call are limiting and deny the subscriber the opportunity to make real time call processing decisions. As such, there is a need for a technique that will allow a subscriber to dynamically control how a call is processed without requiring the application of predefined rules prior to attempting to terminate the call. There is a further need to allow the subscriber's customer premise equipment to ring while the subscriber makes a decision whether to answer the call or initiate one or more call processing options.

SUMMARY OF THE INVENTION

The present invention allows a subscriber to dynamically select one or more call processing options while an attempt to terminate an incoming call to an associated terminal is being made. As such, the terminal is either ringing or providing some other indication that an incoming call is being received. Throughout the process, the incoming call may be answered via the terminal. While the attempt to terminate the call is being made, an incoming call message is sent to a computing device associated with the subscriber. The computing device, upon receiving the incoming call message, will provide one or more call processing options to the subscriber. If the subscriber selects one of the call processing options, the computing device will send a subscriber response message identifying the selected call processing option. Based on the selected call processing option, the incoming call will be processed accordingly.

In one embodiment, an access switch that supports packet based, circuit-switched, or wireless communications supports the terminal, and will either include service node logic or will be able to communicate with a remote service node. The access switch will be able to provide an incoming call notification to the service node logic or the service node to indicate that an attempt to terminate the incoming call is being made, wherein interaction with the computing device to solicit a desired call processing option from the subscriber is effected.

In another embodiment, the subscriber is associated with multiple computing devices, and presence information for the subscriber is obtained and used to determine the most appropriate computing device to use for providing the subscriber with the one or more call processing options upon receiving an incoming call. The call processing options may take any number of forms and may include various types of call forwarding, call rejection, call holding, and the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
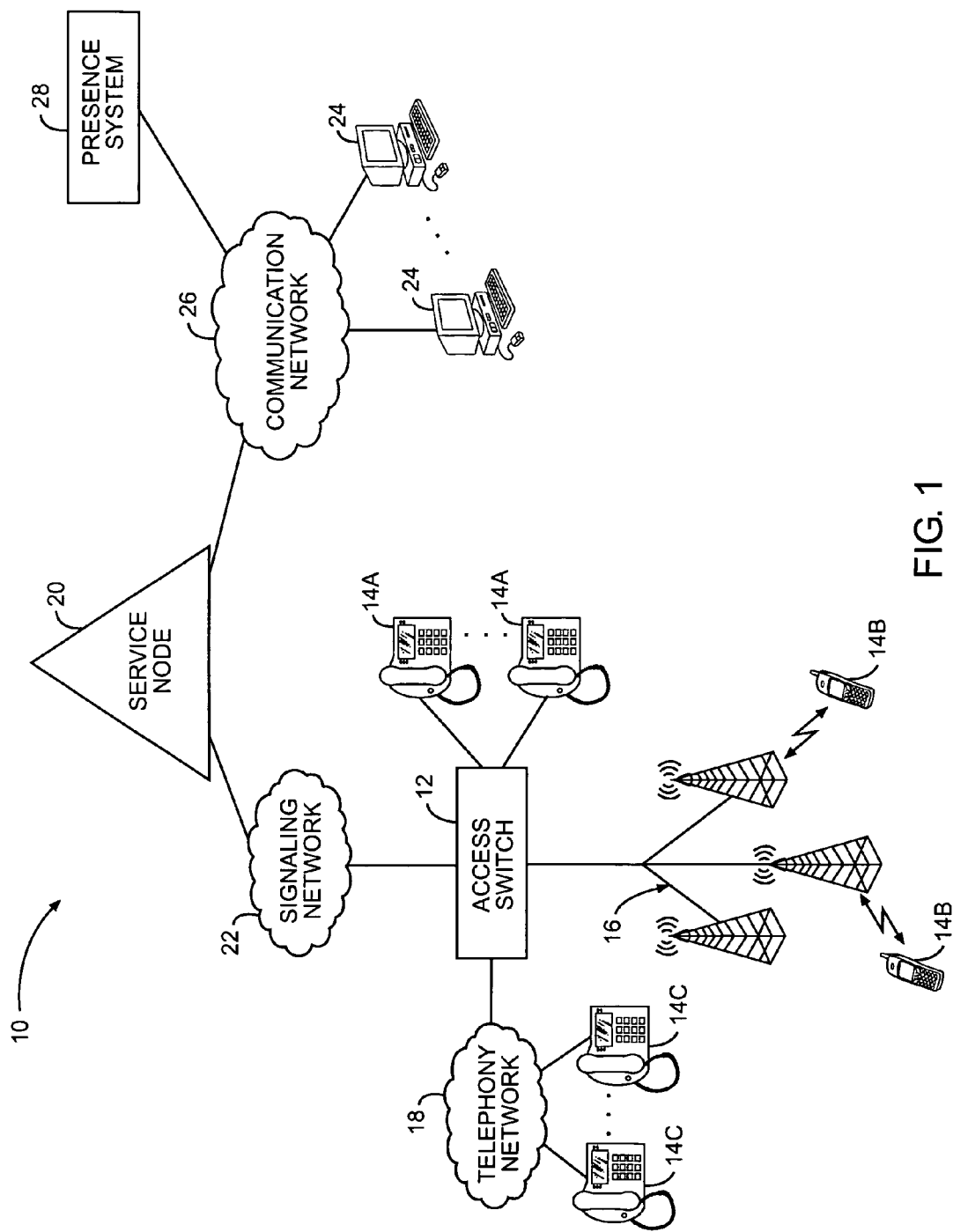
FIG. 1 is a block representation of a communication environment according to one embodiment of the present invention.

With reference to FIG. 1, a block representation of a communication environment 10 is illustrated according to one embodiment of the present invention. The communication environment 10 is centered about an access switch 12, which supports circuit-switched, packet based, or wireless communications with one or more telephony devices 14A or mobile terminals 14B, via an appropriate cellular network of base stations 16. The mobile terminal 14B may take the form of a cellular telephone, portable computer, wireless enabled personal digital assistant (PDA), and the like. The access switch 12 is also coupled to one or more telephony networks 18, which may directly or indirectly support other telephony terminals 14C.

For incoming calls intended for a telephony terminal 14A or mobile terminal 14B, the access switch 12 will access service node logic incorporated within the access switch 12 or provided by a separate entity, such as a service node 20, which will actively cooperate with the access switch 12 to facilitate call processing according to the present invention. Communications between the service node 20 and the access switch 12 may be supported through an appropriate signaling network 22. Communications between the access switch 12 and the service node 20 may use Intelligent Network (IN) or Advanced Intelligent Network (AIN) protocols or the like. The service node 20 may take many forms and may be implemented in various types of entities, such as a service control point, service provider server, media control server, or the like.

For conciseness and clarity, assume an incoming call is intended for a telephony terminal 14A, which is supported by the access switch 12. The access switch 12 will attempt to terminate the call at the appropriate telephony terminal 14A, and concurrently interact with the service node 20 (or internal service node logic) to effectively provide an incoming call alert to the subscriber through a corresponding computing device 24 and receive instructions from the subscriber on how to process the incoming call. The computing device 24 may take many forms, such as a personal computer (PC), PDA, and the like. Notably, the subscriber does not have to respond to the alert, and as such, the telephony terminal 14A will continue to ring until answered or until other predefined call processing rules, such as sending the call to voicemail, are triggered. If a call processing request is received from the subscriber via the computing device 24, the service node 20 will instruct the access switch 12 to process the call accordingly. The service node 20 may communicate with the computing devices 24 via a communication network 26, such as the Internet.

In general, the alert provided to the subscriber via the computing device 24 may take any number of forms, such as simply indicating that an incoming call is being received, providing a list of the available call processing options, and the like. The subscriber's response to the alert is processed by the computing device 24 or the service node 20 to effectively choose whether a call processing option should be invoked, and if multiple call processing options are available, the selected call processing option. Further detail is provided below.

If the user is associated with multiple computing devices 24, the alert may be provided by one or more of the associated computing devices 24. In one embodiment, a presence system 28, which determines the relative availability of the subscriber in association with one of the computing devices 24 or the subscriber's location with respect to one of the computing devices 24, is used to determine where the alert should be provided to the subscriber. As such, the service node 20 may access the presence system 28 to determine the most appropriate computing device 24 to use for providing an alert to the subscriber when an incoming call to the telephone terminal 14A is received. For additional information on presence systems, attention is directed to co-assigned U.S. patent application Ser. Nos. 10/034,431 filed Dec. 27, 2001 entitled DYNAMIC PRESENCE MANAGEMENT; 10/034,429 filed Dec. 27, 2001 entitled REDIRECTION OF INSTANT MESSAGING BASED ON USER PRESENCE; 10/036,247 filed Dec. 27, 2001 entitled PERSONAL USER AGENT; 10/034,519 filed Dec. 28, 2001 entitled BUDDY LIST STATUS NOTIFICATION; 10/079,237 filed Feb. 20, 2002 entitled TELEPHONY USAGE DERIVED PRESENCE INFORMATION; 10/100,703 filed Mar. 19, 2002 entitled MONITORING NATURAL INTERACTION FOR PRESENCE DETECTION; 10/101,286 filed Mar. 19, 2002 entitled CUSTOMIZED PRESENCE INFORMATION DELIVERY; 10/119,923 filed Apr. 10, 2002 entitled PRESENCE INFORMATION BASED ON MEDIA ACTIVITY; 10/119,783 filed Apr. 10, 2002 entitled PRESENCE INFORMATION SPECIFYING COMMUNICATION PREFERENCES; 10/245,476 filed Sep. 17, 2002 entitled PROXIMITY DETECTION FOR MEDIA PROXIES; 10/336,523 filed Jan. 3, 2003 entitled DISTRIBUTED SERVICES BASED ON PRESENCE TECHNOLOGY; 10/262,393 filed Oct. 1, 2002 entitled PRESENCE INFORMATION FOR TELEPHONY USERS; 10/247,591 filed Sep. 19, 2002 entitled DYNAMIC PRESENCE INDICATORS; 10/331,706 filed Dec. 30, 2002 entitled PRESENCE ENABLED QUEUE MANAGEMENT; 10/325,144 filed Dec. 20, 2002 entitled PROVIDING COMPUTER PRESENCE INFORMATION TO AN INTEGRATED PRESENCE SYSTEM; and 10/805,887 filed Mar. 22, 2004 entitled PERSONAL LOCATION INFORMATION MANAGEMENT, the disclosures of which are incorporated herein by reference in their entireties.

Figure 2:
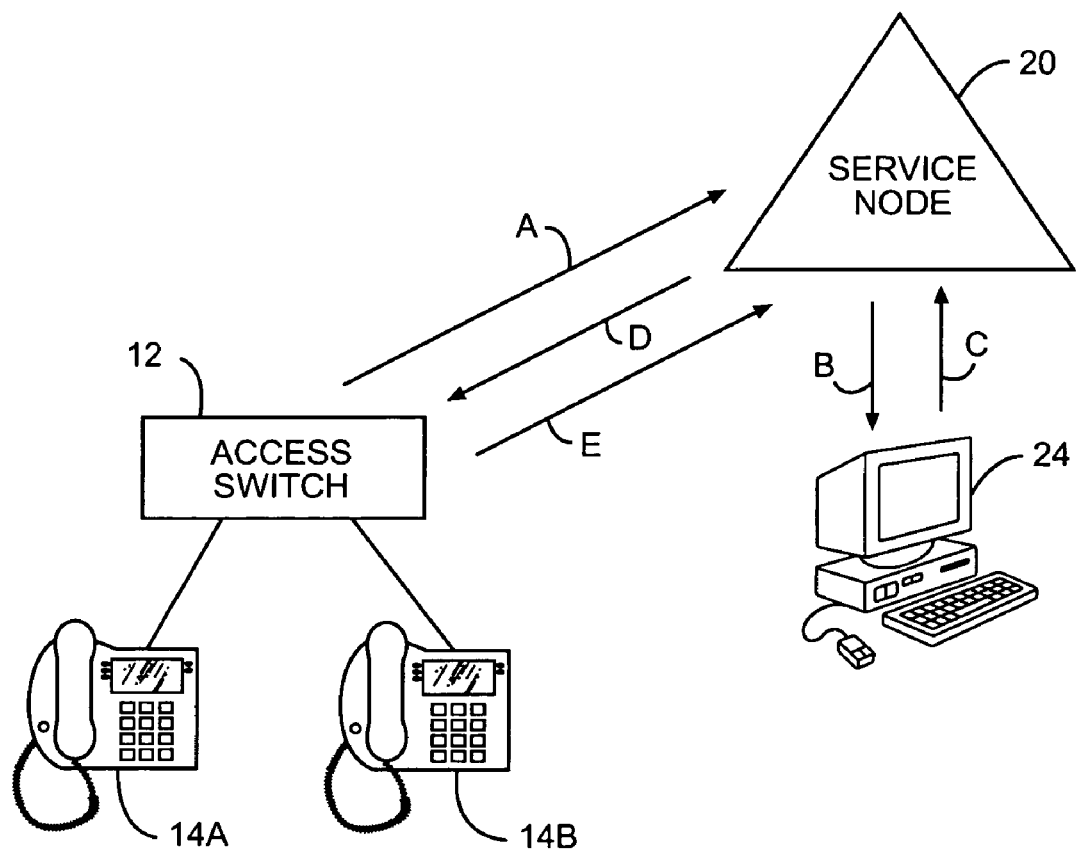
FIG. 2 illustrates a message flow according to a first embodiment of the present invention.

Turning now to FIG. 2, a general message flow is provided according to one embodiment of the present invention. Upon receipt of an incoming call, the access switch 12 will attempt to terminate the call at the appropriate telephony terminal 14A by initiating ringing of the telephony terminal 14A. Concurrently with attempting to terminate the call, the access switch 12 will send an incoming call notification (A) to the service node 20, which will send an incoming call message (B) to the computing device 24. The incoming call message (B) is received by the computing device 24, which will provide an alert to the subscriber. Again, the alert may include one or more call processing options that are available to the subscriber for the incoming call. Notably, the option or options may be included by the service node 20 in the incoming call message (B), or the computing device 24 may be able to recognize information in the incoming call message and determine the call processing options available to the subscriber.

While the alert is being provided to the subscriber via the computing device 24, the telephony terminal 14A is ringing and may be answered to terminate the call. If the subscriber elects one or more of the call processing options, a subscriber response message (C) is sent from the computing device 24 to the service node 20, which will determine the selected call processing option and send a call processing instruction message (D) to the access switch 12. The access switch 12 will receive the instruction message (D) and process the incoming call accordingly. Further, the access switch 12 may send a result message (E) back to the service node 20 to indicate how the call was processed or whether the call was processed as instructed.

In one embodiment, the alert provided to the subscriber through the computing device 24 is a pop-up window, which indicates that an incoming call is being received at the telephony terminal 14A, along with providing any available caller identification information and one or more available call processing options that may be selected by the subscriber through a user interface of the computing device 24. As indicated, the call processing options may be specifically identified in communications from the service node 20, or the indicia sent from the service node 20 can be associated with a list of options at the computing device 24. In any case, the incoming call message from the service node 20 will result in the computing device 24 providing the pop-up window. The subscriber may select a call processing option, elect to close the window without selecting a call processing option, or the pop-up window may close after a certain period of time or upon the incoming call being answered or otherwise processed.

There are numerous call processing options available, with further call processing options that will be developed for future use. These current and future call processing options are considered within the scope of the present invention. Some exemplary call processing options are described below. Initially, there are various types of forwarding options. The forwarding may be directed to all incoming calls intended for the telephony terminal 14A. Alternatively, the incoming calls may be forwarded based on the identity of the caller. In one embodiment, specifically identified callers may be forwarded to another number automatically, wherein in another embodiment the specifically identified callers will be the only callers whose calls are allowed to proceed to the originally dialed number. One of the call processing options may include adding the caller to a list of callers for which special call processing options are afforded. Further, a call processing option may be to forward the call to a voicemail system.

In a similar fashion, all or certain calls may be rejected. For an incoming call, the subscriber may elect to reject the call, add a caller to a list for which future calls may be rejected or allowed to proceed, wherein callers not on the list will have their calls rejected. Another option is to place the call on hold, or otherwise park the call in a manner in which it can be retrieved and allowed to proceed at a later time as directed by the subscriber. If the caller is currently on another line, the call processing option may be to provide a certain busy treatment, wherein the caller may be provided options such as being placed on hold, being forwarded to voicemail, or the like. Other busy treatments may include an announcement indicating the caller is currently on another line. These and other types of announcements may be provided based on the desires of the subscriber and the relative conditions. When the telephony terminal 14A can be controlled directly or indirectly from the computing device 24, an option may be to answer the call, wherein the computing device 24 can effectively instruct the telephony terminal 14A to go off hook or otherwise terminate the incoming call such that communications may take place.

With any of these call processing options, it is important to note that the incoming call is proceeding while these options are being presented to the subscriber. As such, the telephony terminal 14A will ring and continue to ring for a designated amount of time, until predefined call processing options are triggered, until the caller abandons the incoming call, or until the subscriber answers the incoming call. Since there may be some delay in providing the alert to the subscriber and receiving a response, the predefined call processing options, such as forwarding an unanswered call to voicemail, may dictate provisioning the access switch 12 to allow the telephony terminal 14A to ring for a longer period of time prior to triggering the predefined call processing options.

Figure 3:
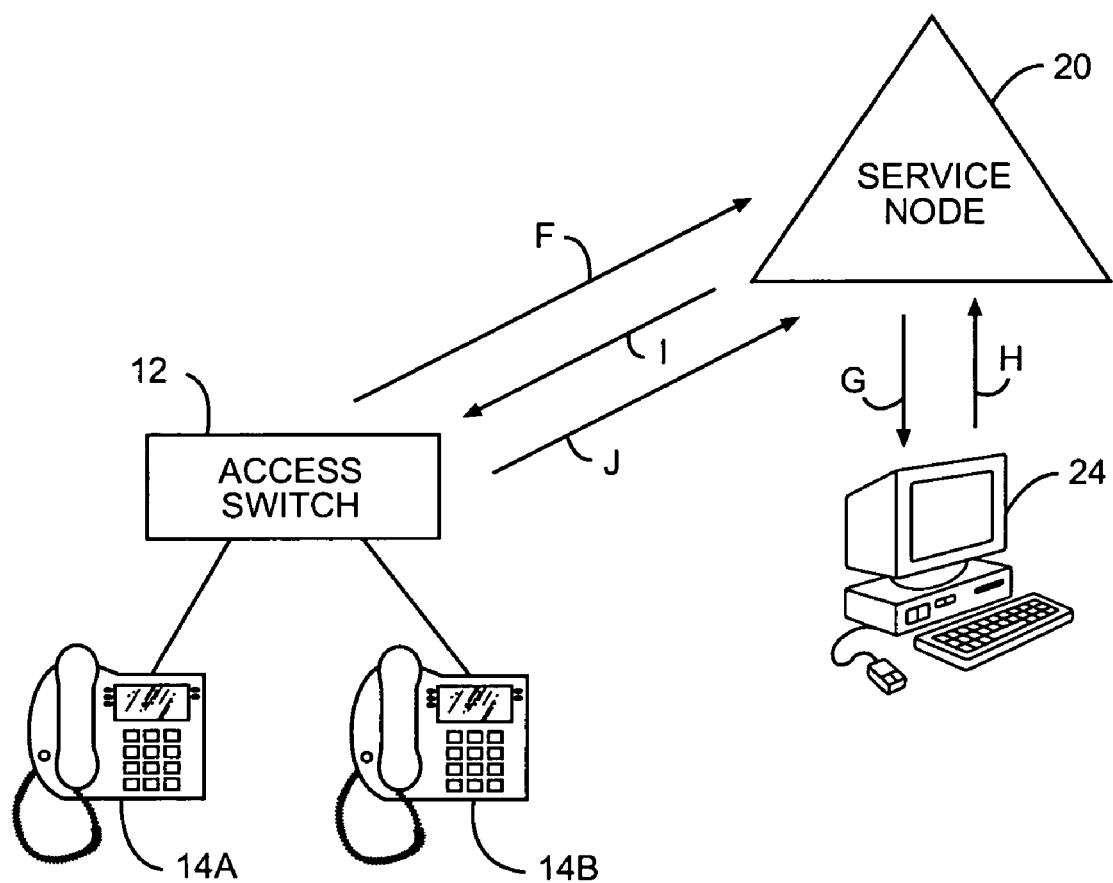
FIG. 3 illustrates a message flow according to a second embodiment of the present invention.

Turning now to FIG. 3, a more specific example is provided wherein the incoming call can dynamically be redirected by the subscriber. Assume that a caller initiates an incoming call to telephony terminal 14A. The call is routed to the access switch 12, which will send an incoming call notification (F), which includes the calling party information and the called party (subscriber) information, to the service node 20. Based on the called party information, the service node 20 will identify the computing device 24 associated with the subscriber, and send an incoming call message (G) to the computing device 24. The service node 20 will recognize that two options should be provided to the subscriber, and as such, the incoming call message (G) will include sufficient instructions to trigger the computing device 24 to provide a first option to forward the call to a predefined destination, such as another telephony address, or forward the call to a destination to be provided by the subscriber. The computing device 24 will present a pop-up window to the subscriber indicating an incoming call is being received and including caller identification information, as well as the two forwarding options. The user will either ignore the pop-up window, select to forward the call to a predefined destination, or enter a telephony address, such as a directory number, to which the incoming call should be forwarded.

If one of the forwarding options is selected, the computing device 24 will send a subscriber response message (H) to the service node 20 identifying the forwarding option, and if necessary, the telephony address to which the incoming call should be forwarded. The service node 20 will process the subscriber response message (H) and provide an instruction message (I) to the access switch 12 to forward the call to the appropriate destination. In response, the access switch 12 can send a result message (J) back to the service node 20 indicating that the call was processed as desired. At any point, the telephony terminal 14A may be answered, as telephony terminal 14A will be ringing in response to the termination attempt. If the subscriber does not respond to the alert through the computing device 24 and fails to answer the telephony terminal 14A, any predefined call processing rules will ultimately control how the call is handled.

Figure 4:
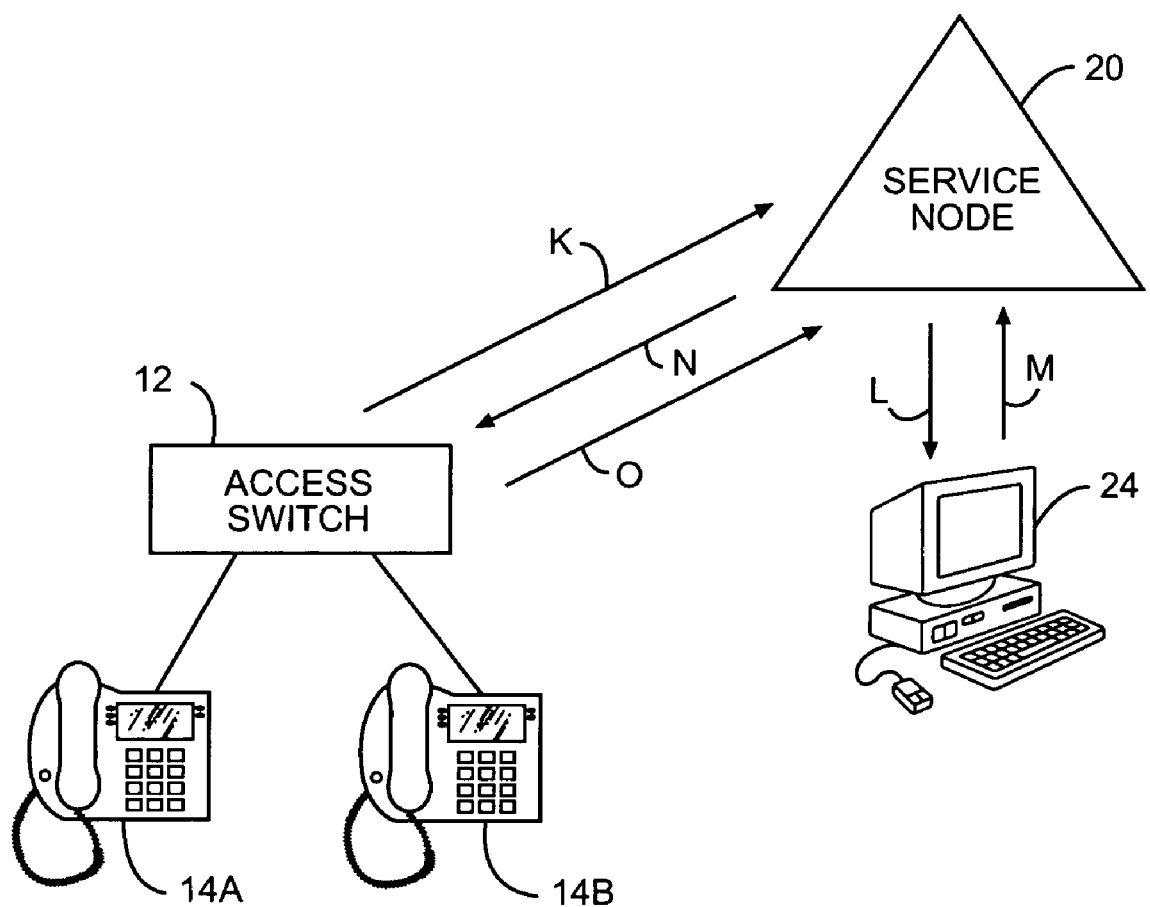
FIG. 4 illustrates a message flow according to a third embodiment of the present invention.

Turning now to FIG. 4, another example is provided wherein the subscriber may elect to reject the call. Again, when an incoming call is received that is intended for telephony terminal 14A, termination is attempted by initiating ringing of the telephony terminal 14A, in conjunction with sending an incoming call notification (K) identifying the calling party and the called party to the service node 20. The service node 20 will send an incoming call message (L) to the computing device 24, which will provide a call processing option to reject the incoming call. As such, an alert will be provided to the subscriber providing the option to reject the incoming call. If the subscriber elects to reject the incoming call based on the caller identification information or for any other reason, the computing device 24 will send a subscriber response message (M) to the service node 20 indicating that the call should be rejected. The service node 20 will then send an instruction message (N) indicating the call should be rejected to the access switch 12, which will take the necessary steps to reject the incoming call by abandoning the termination attempt and thereby stopping the telephony terminal 14A from ringing or otherwise removing the indication that there is an incoming call. The access switch 12 can then send a result message (O) to the service node indicating that the call was properly handled. During this process, the subscriber may be presented with an option to add that particular caller to a list of callers. The list of callers may identify those callers whose calls should be rejected, those whose calls should be processed in a normal fashion, those whose calls should be forwarded, or the like. The options available are virtually limitless and based solely on the desires of the service provider and the subscribers.

Figure 5:
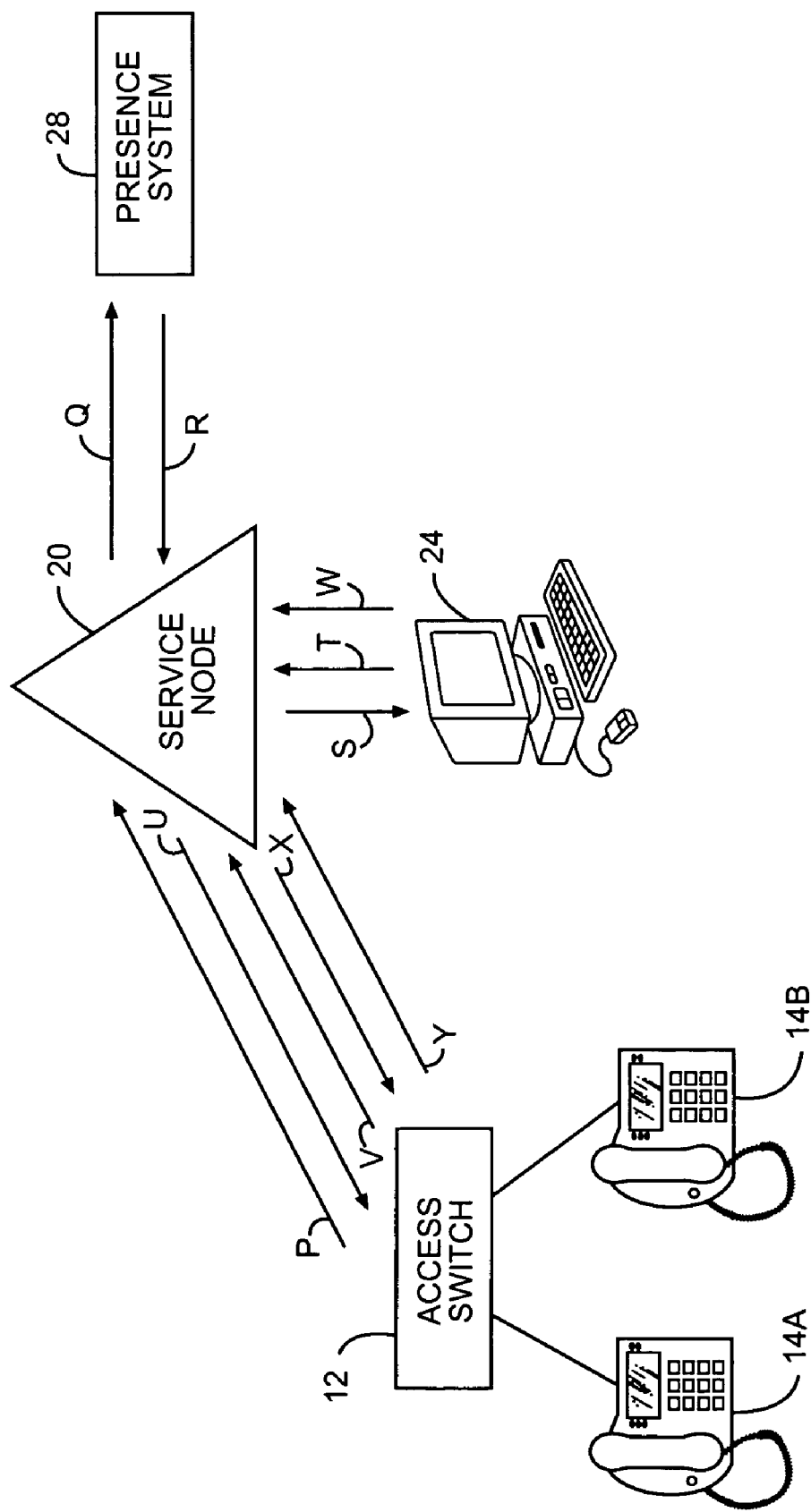
FIG. 5 illustrates a message flow according to a fourth embodiment of the present invention.

Yet another example is provided in FIG. 5, wherein an incoming call is placed on hold and later retrieved under the control of the subscriber through an associated computing device 24. Initially, an incoming call is received by the access switch 12 and intended for telephony terminal 14A. The access switch 12 will initiate a termination attempt by causing the telephony terminal 14A to ring, as well as sending an incoming call notification (P), which includes the calling and called party information, to the service node 20. In this example, the service node 20 is configured to access the presence system 28 to determine the most appropriate one of multiple computing devices 24 associated with the telephony terminal 14A or the corresponding subscriber. As such, a presence query (Q) is sent to the presence system 28 to retrieve information identifying the most appropriate computing device 24 to which to provide an incoming call alert for the subscriber. The presence system 28 will identify the most appropriate computing device 24 and send a presence response (R) to the service node 20, which will receive information in the presence response (R) to send an incoming call message (S) to the appropriate computing device 24.

In this example, at least one of the options to be provided to the subscriber is one to place the incoming call on hold. As such, the computing device 24 will provide an alert to the subscriber wherein the call processing options include placing the call on hold. Assuming the subscriber elects to place the incoming call on hold, a subscriber response message (T) is sent back to the service node 20 indicating that the incoming call should be placed on hold. Notably, the incoming call has not been terminated at this point and is only being attempted. As such, the telephony terminal 14A is continuing to ring at this point. The service node 20 will then send an instruction message (U) to the access switch to place the incoming call on hold. The access switch 12 will take the necessary steps to hold the call, such as using a call park feature, and provide an appropriate result message (V) to the service node 20. The access switch 12 may coordinate with other intelligent peripherals to provide an announcement to the caller indicating that the call has been parked or otherwise placed on hold and will be retrieved by the subscriber momentarily. At this point, telephony terminal 14A will stop ringing.

When the subscriber desires to retrieve the call, an appropriate input may be provided at the computing device 24, which will send a second subscriber response message (W) to the service node 20, which will then send a second instruction message (X) to retrieve the call to the access switch 12, which will take the necessary steps to terminate the call at telephony terminal 14A. At this point, telephony terminal 14A will resume ringing and the access switch 12 may send a second result message (Y) to the service node 20 indicating that the call has been processed accordingly.

With the present invention, incoming calls are allowed to proceed in a normal fashion and are only affected by the dynamic call processing control selected by the subscriber, if the subscriber selects an appropriate call processing option and the call processing entities or logic are working properly. As such, a failure in the dynamic call processing entities, such as the service node 20, will not impact the incoming call attempt. Further, the incoming call is not delayed by trying to query the subscriber to determine how to dynamically process the call. Those skilled in the art will recognize that the concepts of the present invention are applicable to various communication technologies and that the above examples are merely illustrative and not intended to limit the teachings of the present invention in any fashion. Further, the various call processing messages may take many forms and may be combined in various ways without veering from the concepts of the present invention.

Figure 6:
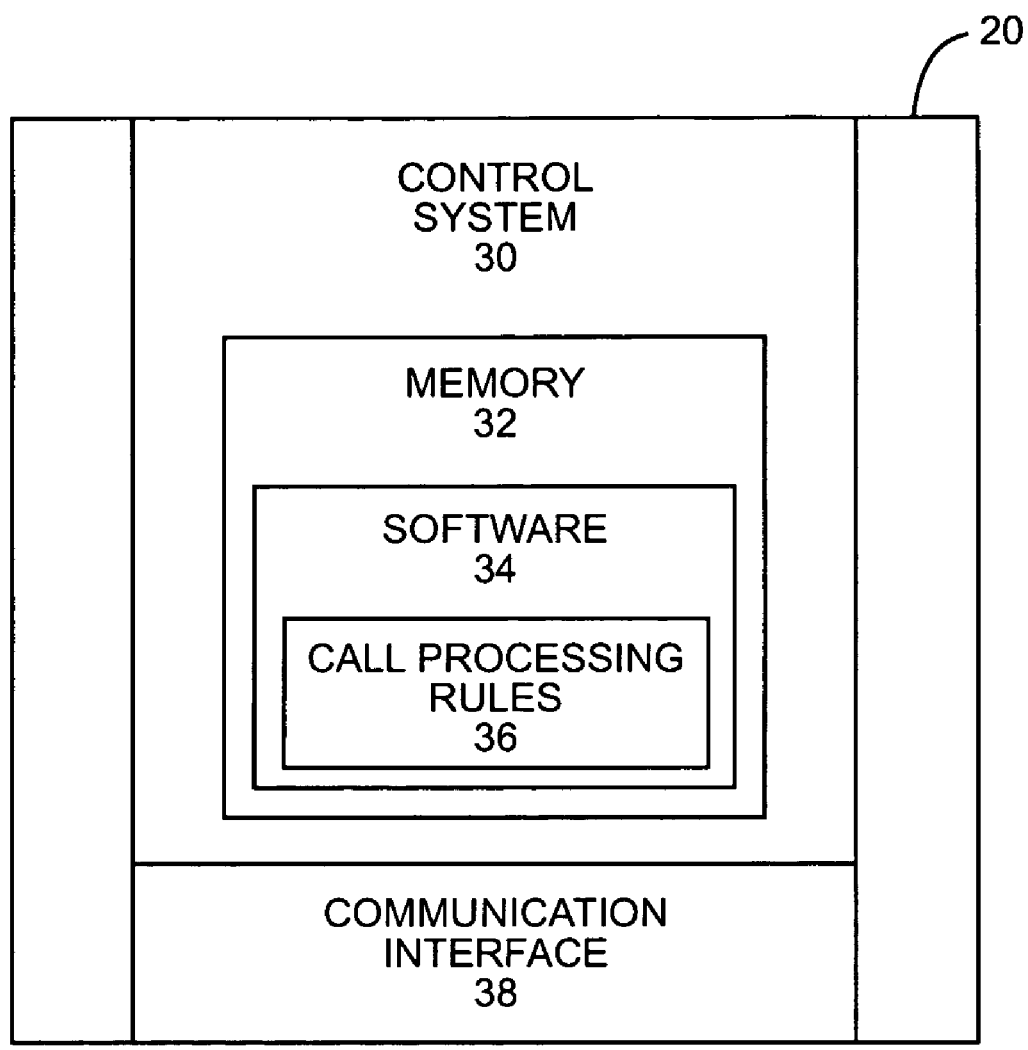
FIG. 6 is a block representation of a service node according to one embodiment of the present invention.

Turning now to FIG. 6, a block representation of a service node 20 is illustrated. The service node 20 may include a control system 30 having memory 32 for storing the requisite software 34 to facilitate the functionality described above and the call processing rules 36 for the various subscribers subscribing to the call processing service. The control system 30 is also associated with a communication interface 38 to facilitate communications directly or indirectly with the access switch 12, presence system 28, and any other entities necessary for implementing the present invention. Notably, the functionality of the service node 20 may be imbedded in the access switch 12 or in an associated peripheral.

Figure 7:
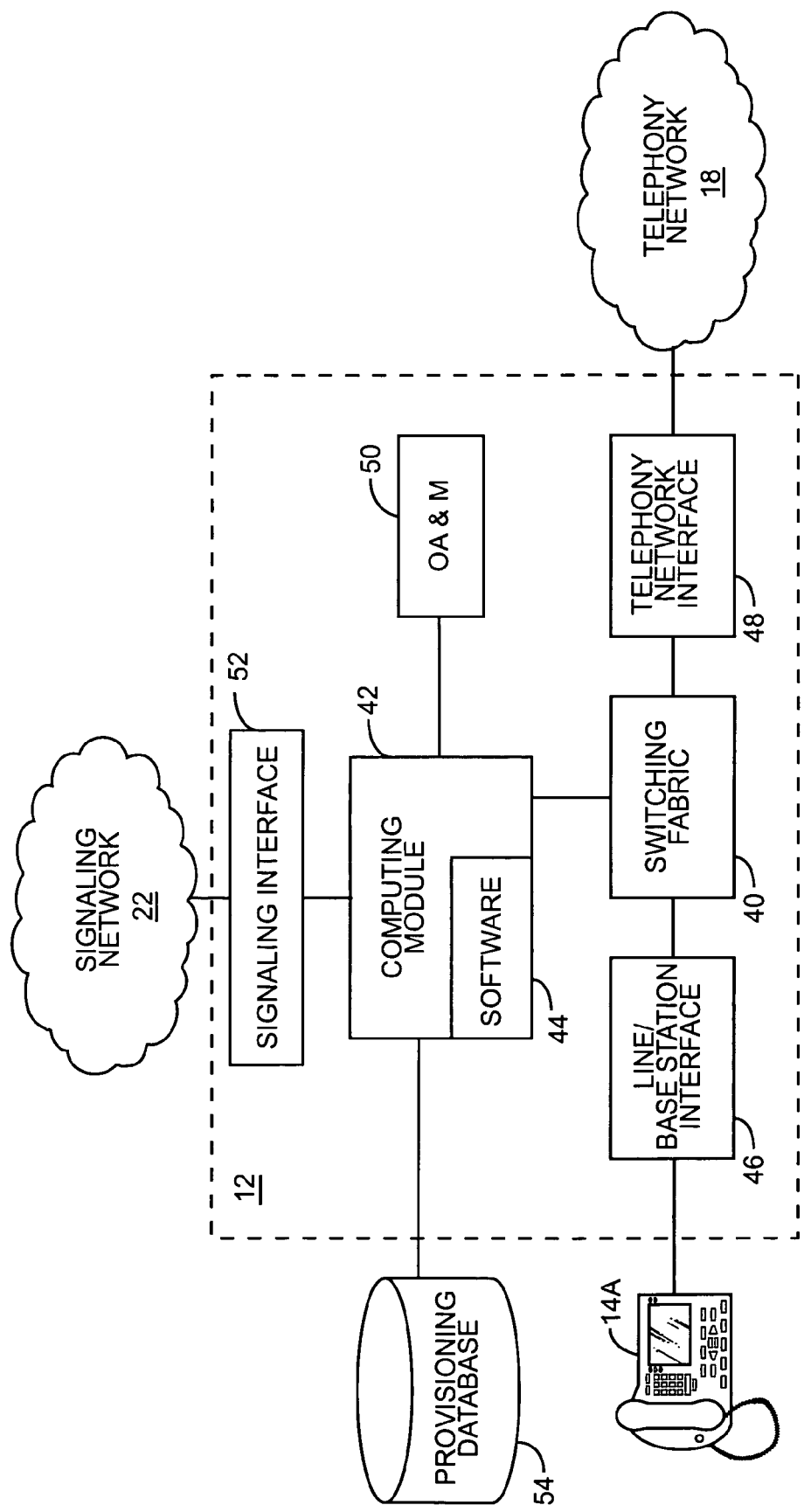
FIG. 7 is a block representation of an access switch according to one embodiment of the present invention.

Turning now to FIG. 7, a block representation of an access switch 12 is illustrated. The access switch 12 is represented generically and is intended to cover the logical functionality of land based and mobile switching systems for circuit-switched or packet based communication systems, which include all control for call server based functions. These switches may be implemented in a variety of ways using different equipment types, such as Nortel Networks Limited's DMS-100 local switching system. In one embodiment, the access switch 12 may include switching fabric 40, a computing module 42 including software 44, a line/base station interface 46, a telephony interface 48, an operations/administration and maintenance (OA & M) module 50 and a signaling interface 52. The switching fabric 40 may comprise logical and physical switches for interconnecting the line/base station interface 46 with the remainder of the telephony network 18 through the telephony interface 48. Depending on a land based or wireless embodiment, the line/base station interface 46 will either directly support subscribers through subscriber lines or packet networks, or will support base stations, which facilitate wireless communications with mobile devices. As illustrated, the computing module 42 controls circuit-switched communications via the switching fabric 40 and is capable of providing traditional Intelligent Network monitoring and functions. Further, the computing module 40 may cooperate with a provisioning database 54, which controls the fundamental operation of the access switch 12. In operation, the software 44 of the computing module 42 is modified to interact with the service node 20 or implement service node logic to facilitate operation as described above.

Those skilled in the art will recognize improvements and modifications to the preferred embodiments of the present invention. All such improvements and modifications are considered within the scope of the concepts disclosed herein and the claims that follow.

What is claimed is:

1. A method comprising:
 a) detecting an attempt to terminate an incoming call to a terminal;
 b) upon detecting the attempt to terminate, sending an incoming call message to a computing device, which is adapted to provide to a subscriber at least one call processing option for processing the incoming call upon receipt of the incoming call message, wherein the incoming call may be answered at the terminal during the attempt to terminate.

2. The method of claim 1 wherein the attempt to terminate causes the terminal to ring.

3. The method of claim 1 wherein detecting the attempt to terminate comprises receiving an incoming call notification from an access switch, which is attempting to terminate the incoming call to the terminal.

4. The method of claim 1 further comprising receiving a subscriber response message from the computing device, the subscriber response message comprising a selected call processing option selected by the subscriber from the at least one call processing option.

5. The method of claim 4 further comprising effecting the selected call processing option for the incoming call.

6. The method of claim 5 wherein effecting the selected call processing option comprises sending an instruction message to apply the selected call processing option for the incoming call to an access switch, which is attempting to terminate the incoming call to the terminal.

7. The method of claim 1 further comprising accessing a presence service to select the computing device from a plurality of computing devices.

8. The method of claim 7 wherein the computing device is selected based on a relative proximity of the subscriber to the plurality of computing devices.

9. The method of claim 1 wherein a plurality of call processing options including the at least one call processing option are provided to the subscriber.

10. The method of claim 1 wherein if no call processing response message is provided by the subscriber, predefined call processing is applied to the incoming call after a period of time.

11. The method of claim 1 wherein the at least one call processing option comprises forwarding the incoming call.

12. The method of claim 11 wherein the incoming call is forwarded to voicemail.

13. The method of claim 11 wherein the incoming call is forwarded to a predefined number.

14. The method of claim 11 wherein the incoming call is forwarded to an address dynamically provided by the subscriber.

15. The method of claim 1 wherein the at least one call processing option comprises rejecting the incoming call.

16. The method of claim 1 wherein the at least one call processing option comprises holding the incoming call.

17. The method of claim 1 wherein the at least one call processing option comprises answering the incoming call.

18. The method of claim 1 wherein the at least one call processing option comprises providing an announcement to a caller initiating the incoming call.

19. A system comprising:
  a) at least one communication interface; and
  b) a control system associated with the at least one communication interface and adapted to:
    i) detect an attempt to terminate an incoming call to a terminal;
    ii) upon detecting the attempt to terminate, send an incoming call message to a computing device, which is adapted to provide to a subscriber at least one call processing option for processing the incoming call upon receipt of the incoming call message, wherein the incoming call may be answered at the terminal during the attempt to terminate.

20. The system of claim 19 wherein the attempt to terminate causes the terminal to ring.

21. The system of claim 19 wherein to detect the attempt to terminate, the control system is further adapted to receive an incoming call notification from an access switch, which is attempting to terminate the incoming call to the terminal.

22. The system of claim 19 wherein the control system is further adapted to receive a subscriber response message from the computing device, the subscriber response message comprising a selected call processing option selected by the subscriber from the at least one call processing option.

23. The system of claim 22 wherein the control system is further adapted to effect the selected call processing option for the incoming call.

24. The system of claim 23 wherein to effect the selected call processing option, the control system is further adapted to send an instruction message to apply the selected call processing option for the incoming call to an access switch, which is attempting to terminate the incoming call to the terminal.

25. The system of claim 19 wherein the control system is further adapted to access a presence service to select the computing device from a plurality of computing devices.

26. The system of claim 25 wherein the computing device is selected based on a relative proximity of the subscriber to the plurality of computing devices.

27. The system of claim 19 wherein a plurality of call processing options including the at least one call processing option are provided to the subscriber.

28. The system of claim 19 wherein if no call processing response message is provided by the subscriber, predefined call processing is applied to the incoming call after a period of time.

29. The system of claim 19 wherein the at least one call processing option comprises forwarding the incoming call.

30. The system of claim 29 wherein the incoming call is forwarded to voicemail.

31. The system of claim 29 wherein the incoming call is forwarded to a predefined number.

32. The system of claim 29 wherein the incoming call is forwarded to an address dynamically provided by the subscriber.

33. The system of claim 19 wherein the at least one call processing option comprises rejecting the incoming call.

34. The system of claim 19 wherein the at least one call processing option comprises holding the incoming call.

35. The system of claim 19 wherein the at least one call processing option comprises answering the incoming call.

36. The system of claim 19 wherein the at least one call processing option comprises providing an announcement to a caller initiating the incoming call.

* * * * *